(12) United States Patent
Moon et al.

(10) Patent No.: US 9,088,043 B2
(45) Date of Patent: Jul. 21, 2015

(54) APPARATUS AND METHOD FOR COATING A FUNCTIONAL LAYER

(75) Inventors: So-Il Moon, Yongin-si (KR); Jee-Sang Hwang, Yongin-si (KR); Su-Hwan Kim, Yongin-si (KR); Hyoung-No Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 13/617,068

(22) Filed: Sep. 14, 2012

(65) Prior Publication Data

US 2013/0017319 A1 Jan. 17, 2013

Related U.S. Application Data

(63) Continuation of application No. 12/923,506, filed on Sep. 24, 2010.

(60) Provisional application No. 61/282,409, filed on Feb. 4, 2010.

(51) Int. Cl.
*B05C 11/04* (2006.01)
*B05D 3/12* (2006.01)
(Continued)

(52) U.S. Cl.
CPC .............. *H01M 4/366* (2013.01); *B05C 1/083* (2013.01); *B05C 1/0817* (2013.01); *B05C 1/0826* (2013.01); *B05C 1/0856* (2013.01); *B05C 1/0869* (2013.01); *B05C 1/12* (2013.01); *B05C 1/165* (2013.01); *B05C 11/04* (2013.01); *B05C 11/041* (2013.01); *H01M 4/0402* (2013.01); *H01M 4/0404* (2013.01); *H01M 4/0409* (2013.01); *H01M 10/0431* (2013.01); *H01M 10/4235* (2013.01); *B05D 1/28* (2013.01); *Y02E 60/122* (2013.01)

(58) Field of Classification Search
None
See application file for complete search history.

(56) References Cited

U.S. PATENT DOCUMENTS 3,811,834 A * 5/1974 Schwemmer et al. ........ 118/262
4,309,960 A * 1/1982 Waldvogel .................... 118/665
(Continued)

FOREIGN PATENT DOCUMENTS

DE 196 27 456 A1 1/1998
EP 0 922 500 A2 6/1999
(Continued)

OTHER PUBLICATIONS

Japanese Office Action in JP 2011-016271, dated Jan. 22, 2013 (Moon, et al.).
(Continued)

*Primary Examiner* — Dah-Wei D Yuan
*Assistant Examiner* — Binu Thomas
(74) *Attorney, Agent, or Firm* — Lee & Morse, P.C.

(57) ABSTRACT

An apparatus and method for coating a functional layer on a current collector with an active material layer thereon, the apparatus including a first roll and a second roll, the first roll and second roll being for advancing the current collector; a gravure roll, the gravure roll being configured to coat the functional layer on the active material layer; a thickness measurer, the thickness measurer being configured to measure at least one of a thickness of the active material layer and a sum thickness of the active material layer and the functional layer; and a controller, the controller being in communication with the thickness measurer and being configured to control a rotation speed of the gravure roll.

6 Claims, 10 Drawing Sheets

(51) Int. Cl.
*H01M 4/04* (2006.01)
*H01M 4/36* (2006.01)
*B05C 1/16* (2006.01)
*B05C 1/12* (2006.01)
*B05C 1/08* (2006.01)
*H01M 10/04* (2006.01)
*H01M 10/42* (2006.01)
*B05D 1/28* (2006.01)

(56) References Cited

U.S. PATENT DOCUMENTS

| | | | |
|---|---|---|---|
| 4,948,635 A * | 8/1990 | Iwasaki | 118/259 |
| 5,620,514 A * | 4/1997 | Munter et al. | 118/249 |
| 5,783,042 A * | 7/1998 | Leeman et al. | 15/256.51 |
| 6,155,166 A | 12/2000 | Bertagna et al. | |
| 6,203,615 B1 | 3/2001 | Munch | |
| 7,052,551 B2 | 5/2006 | Shida et al. | |
| 7,108,766 B1 * | 9/2006 | Eskelinen et al. | 162/263 |
| 7,891,313 B2 | 2/2011 | Wakai et al. | |
| 2009/0092742 A1 | 4/2009 | Teramoto et al. | |
| 2010/0062146 A1* | 3/2010 | Hayashi et al. | 118/58 |
| 2011/0189378 A1 | 8/2011 | Moon et al. | |
| 2012/0183681 A1 | 7/2012 | Umebara | |

FOREIGN PATENT DOCUMENTS

| | | |
|---|---|---|
| EP | 1 825 929 A1 | 8/2007 |
| JP | 01-118403 A | 5/1989 |
| JP | 02-106809 A | 4/1990 |
| JP | 03-123670 A | 5/1991 |
| JP | 05-115832 A | 5/1993 |
| JP | 06-071849 A | 3/1994 |
| JP | 06-129978 A | 5/1994 |
| JP | 07-289982 A | 7/1995 |
| JP | 11-101615 A | 4/1999 |
| JP | 2001-266943 A | 9/2001 |
| JP | 2003-145703 A | 5/2003 |
| JP | 2005-034733 A | 2/2005 |
| JP | 2005074324 A * | 3/2005 |
| JP | 2007-253108 A | 10/2007 |
| JP | 2008-166113 A | 7/2008 |
| JP | 2009-028719 A | 2/2009 |
| JP | 2009-193906 A | 8/2009 |
| JP | 2009-262070 A | 11/2009 |
| WO | WO 2008081779 A1 * | 7/2008 |
| WO | WO 2009/125634 A1 | 10/2009 |

OTHER PUBLICATIONS

Chinese Office Action in CN 201110034897.6, dated Feb. 22, 2013, with English Translation (Moon, et al.).

Japanese Office Action in JP 2011-016271, dated May 14, 2013 (Moon, et al.).

U.S. Advisory Action in U.S. Appl. No. 12/923,506, dated May 22, 2013 (Moon, et al.).

USPTO Advisory action dated Dec. 16, 2014 for parent U.S. Appl. No. 12/923,506. Moon, et al.

USPTO Office action dated Sep. 26, 2014 for parent U.S. Appl. No. 12/923,506. Moon, et al.

* cited by examiner

APPARATUS AND METHOD FOR COATING A FUNCTIONAL LAYER

CROSS-REFERENCE TO RELATED APPLICATION

This is a divisional application based on pending application Ser. No. 12/923,506, filed Sep. 24, 2010. Further, this application claims priority to U.S. Provisional Application No. 61/282,409, filed Feb. 4, 2010, and entitled "Functional Layer Coating Apparatus, Coating Method and Rechargeable Battery Using the Same." The entire contents of both parent applications are hereby incorporated by reference in their entirety and for all purposes.

BACKGROUND

1. Field

Embodiments relate to an apparatus and method for coating a functional layer.

2. Description of the Related Art

A rechargeable battery may include an electrode plate formed by coating different kinds of functional layers on an active material layer on a current collector in order to enhance thermal stability. Materials for forming the functional layer may be maintained in a slurry state when supplied to a coating apparatus.

For example, in order to form a functional material in a thin film, a coating apparatus may perform pattern coating of a functional layer on an active material layer that is formed in a pattern on a current collector by applying a micro gravure coating method that coats by directly contacting a gravure roll to the current collector.

Thus, the electrode plate may include a multi-layer structure including a current collector, an active material layer, and a functional layer. A coating thickness of the functional layer in a wet state may be about 10 μm to about 15 μm. In a rechargeable battery, it is desirable to coat a functional layer material on an active material layer with an accurate dimension to thereby form the functional layer in a uniform thickness.

The above information disclosed in this Background section is only for enhancement of understanding of the background of the described technology and therefore it may contain information that does not form the prior art that is already known in this country to a person of ordinary skill in the art.

SUMMARY

Embodiments are directed to an apparatus and method for coating a functional layer, which represent advances over the related art.

It is a feature of an embodiment to provide an apparatus and method for coating a functional layer that uniformly forms a sum thickness of an active material layer and a functional layer without a thickness deviation.

At least one of the above and other features and advantages may be realized by providing an apparatus for coating a functional layer on a current collector with an active material layer thereon, the apparatus including a first roll and a second roll, the first roll and second roll being for advancing the current collector; a gravure roll, the gravure roll being configured to coat the functional layer on the active material layer; a thickness measurer, the thickness measurer being configured to measure at least one of a thickness of the active material layer and a sum thickness of the active material layer and the functional layer; and a controller, the controller being in communication with the thickness measurer and being configured to control a rotation speed of the gravure roll.

The controller may be configured to control the rotation speed of the gravure roll based on a difference between a thickness of the active material layer and a predetermined desired thickness.

The controller may be configured to control the rotation speed of the gravure roll based on a difference between the sum thickness and a predetermined desired thickness.

The apparatus may further include a doctor blade unit configured to scrape excess functional layer material off the gravure roll, wherein the controller is further configured to control a position of the doctor blade unit.

At least one of the above and other features and advantages may also be realized by providing a method of coating a functional layer on a current collector with an active material layer thereon, the method including advancing the current collector with the active material layer thereon along a first roll and a second roll; coating a functional layer on the active material layer with a gravure roll; and controlling a rotational speed of the gravure roll such that a sum thickness of the functional layer and the active material layer is uniform along a length of the functional layer.

Coating the functional layer may include measuring a thickness of the active material layer with a measurer, comparing the thickness of the active material layer with a predetermined desired thickness, forming a functional layer on the active material layer such that the sum thickness of the functional layer and the active material layer equals the predetermined desired thickness.

Controlling the rotational speed may include measuring a sum thickness of the active material layer and the functional layer with the measurer, comparing the sum thickness with a predetermined desired thickness, controlling a rotational speed of the gravure roll based on a difference between the sum thickness and the predetermined desired thickness.

Measuring a sum thickness of the active material layer and the functional layer may take place downstream of the gravure roll, and controlling the rotational speed of the gravure roll based on the difference between the sum thickness and the predetermined desired thickness may include controlling the sum thickness of an active material layer and functional layer and may take place upstream of the measurer based on measurement of the sum thickness by the measurer downstream of the gravure roll.

At least one of the above and other features and advantages may also be realized by providing an apparatus for coating a functional layer on a current collector with an active material layer thereon, the apparatus including a gravure roll, the gravure roll being configured to coat the functional layer on the active material layer; a doctor blade unit, the doctor blade unit including a doctor blade, the doctor blade unit being configured to scrape excess functional layer material off the gravure roll with the doctor blade, and at least one strain gauge, the at least one strain gauge being configured to measure a strain of the doctor blade; and a controller, the controller being in communication with the at least one strain gauge and being configured to control a position of the doctor blade unit.

The controller may be configured to control the position of the doctor blade unit based on the strain of the doctor blade.

The doctor blade unit may include a support between the doctor blade and the at least one strain gauge, a holder, the holder holding the support and the doctor blade, and at least one servo motor, the at least one servo motor being controlled by the controller and being configured to move the holder relative to the gravure roll and change a pressure between the doctor blade and the gravure roll.

The controller may be further configured to control a rotational speed of the gravure roll.

At least one of the above and other features and advantages may also be realized by providing a method of coating a functional layer on a current collector with an active material layer thereon, the method including detecting a measured strain on a doctor blade; comparing the measured strain with an optimum value for strain on the doctor blade; maintaining the doctor blade in an optimum blading state based on the detecting the measured strain and the comparing the measured strain with the optimum value for strain, thereby removing excess functional layer material from the gravure roll; advancing the current collector having the active material layer thereon; and coating the functional layer on the active material layer with the gravure roll such that a sum thickness of the functional layer and the active material layer is uniform across a length of the functional layer.

Maintaining the doctor blade in the optimum blading state may include changing a pressure between the doctor blade and the gravure roll by moving the doctor blade relative to the gravure roll using at least one servo motor based on a difference between the measured strain and the optimum value for the strain.

Maintaining the doctor blade in the optimum blading state may include detecting the measured strain with at least one strain gauge.

The at least one strain gauge may be disposed on a support, the support being between the strain gauge and the doctor blade.

The support and the doctor blade may be held by a holder, and the servo motor may move the holder relative to the gravure roll in order to change the pressure between the doctor blade and the gravure roll.

Maintaining the doctor blade in the optimum blading state may include setting the doctor blade in the optimum blading state against the gravure roll; measuring the optimum value for strain with a strain gauge while the doctor blade is in the optimum blading state; inputting the optimum value for strain to a controller; continuously measuring a measured strain on the doctor blade with the strain gauge, comparing the measured strain to the optimum value for strain, and optimizing the pressure between the doctor blade and the gravure roll by moving the doctor blade relative to the gravure roll when the measured strain does not equal the optimum value for strain.

Maintaining the doctor blade in the optimum blading state may further include sounding an alarm when a distance that the doctor blade has moved relative to the gravure roll is greater than a predetermined upper limit distance.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
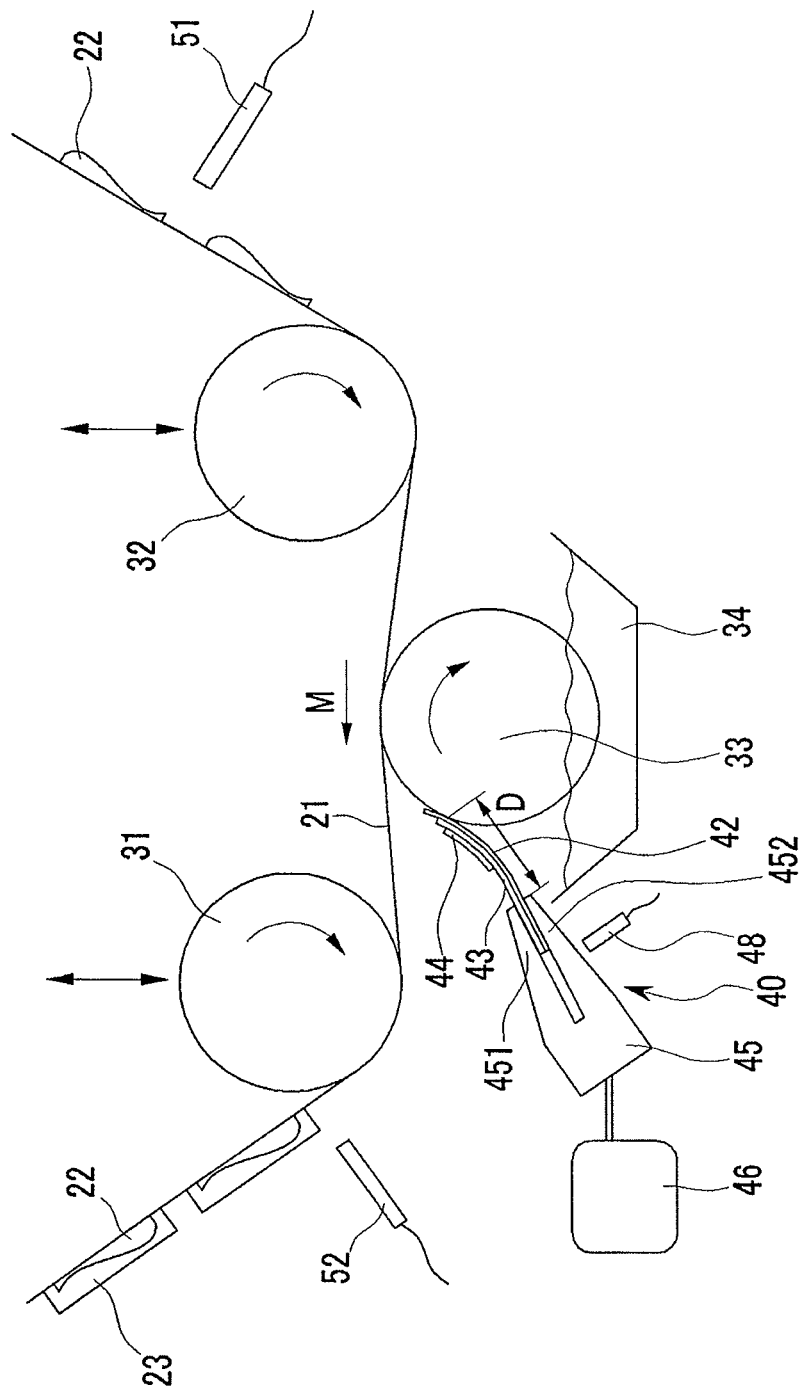
FIG. 1 illustrates a schematic diagram of a functional layer coating apparatus according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
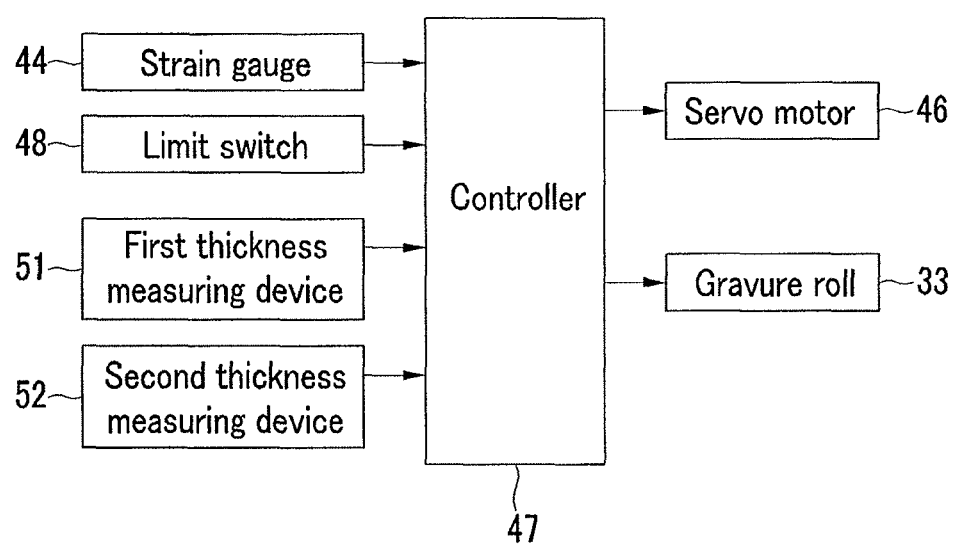
FIG. 2 illustrates a block diagram of a configuration of controlling the functional layer coating apparatus of FIG. 1.

FIG. 1 illustrates a schematic diagram of a configuration of a functional layer coating apparatus according to an embodiment. FIG. 2 illustrates a block diagram of a configuration of controlling the functional layer coating apparatus of FIG. 1. Referring to FIGS. 1 and 2, the functional layer coating apparatus (hereinafter referred to as a "coating apparatus") may thinly form a functional layer on a base member using a micro gravure coating method. For example, the micro gravure coating method may form a thin film of about 0.1 μm to about 200 μm on a base member.

The coating apparatus according to the present embodiment may use, as a base member, a current collector 21 that forms an electrode plate 2 (see FIG. 8) in a rechargeable battery. An active material layer 22 may be formed on the current collector 21. As illustrated in FIG. 1, the active material layer 22 may be formed in a predetermined pattern on the current collector 21. In an implementation, the active material layer 22 may be formed in an integral structure (not illustrated) that is continuously connected to the current collector 21.

The coating apparatus may include a first roll 31 and a second roll 32 that advance the current collector 21 in one direction, i.e., from an upstream side to a downstream side, a gravure roll 33 that coats a functional layer 23 on the active material layer 22, a reservoir 34 that houses a functional layer material, a doctor blade unit 40 including a doctor blade 42 that scrapes excess functional layer material from the gravure roll 33, a first thickness measuring device 51 that measures a thickness T1 of the active material layer 22, and a second thickness measuring device 52 that measures a sum thickness T2 of the active material layer 22 and the functional layer 23. The functional layer material may be formed as a ceramic slurry having an electrical insulating property in order to enhance thermal stability of the rechargeable battery.

Specifically, in the coating apparatus, the first and second rolls 31 and 32 may advance the current collector 21 in one direction while respectively rotating in the same direction (counterclockwise direction in FIG. 1); and the gravure roll 33 may rotate in an opposite direction (clockwise direction in FIG. 1). The first and second rolls 31 and 32 may form a functional layer 23 pattern in the current collector 21 by being lifted in the vertical direction. That is, the first and second rolls 31 and 32 may be lowered to coat the functional layer 23 on the current collector 21 and lifted to temporarily stop the coating to thereby form the functional layer 23 pattern on the active material layer 22. The gravure roll 33 may be installed and may rotate in a state in which it is partially submerged in a functional layer material in an upper part of the reservoir 34. Thus, the gravure roll 33 may load the functional layer material into a minute groove therein (not shown) and on a surface thereof. Then, the gravure roll 33 may coat the functional layer material that is loaded in the minute groove onto the active material layer 22 of the current collector 21 by further rotating. Therefore, the current collector 21 that passes along the gravure roll 33 may form the electrode plate 2 including the active material layer 22 and the functional layer 23. When the functional layer material is coated, the gravure roll 33 may press against the current collector 21 that is advanced by the first and second rolls 31 and 32.

In order to coat the functional layer material on the active material layer 22 pattern, the first and second rolls 31 and 32 may be lifted and/or lowered at a predetermined time differential. In addition, an advancing length L1 of the current collector 21 with the first and second rolls 31 and 32 in the lowered state, i.e., a length L1 of the functional layer 23, may be the same as or longer than a length L2 of the active material layer 22 that is set in an advancing direction of the current collector 21. Thus, side end portions L3 and L4 of the functional layer 23 may be further formed with the functional layer material at both ends of the active material layer 22 (see FIGS. 8 and 10).

The doctor blade 42 may be positioned adjacent to the gravure roll 33 to press an end portion thereof against the gravure roll 33 at an inflow side of the current collector 21. Thus, the doctor blade 42 may scrape the functional layer material off of the gravure roll 33. By such a scraping operation, excess functional layer material remaining outside of the minute groove and on a surface of the gravure roll 33 may be removed; and the functional layer material may be filled within, i.e., loaded into, the minute groove.

In order to measure the thickness T1 of the active material layer 22, the first thickness measuring device 51 may be disposed in front of the gravure roll 33, i.e., at an inflow side in an advancing direction M of the current collector 21. That is, the first thickness measuring device 51 may measure the thickness T1 of the active material layer 22 prior to coating the functional layer material thereon. In order to measure the sum thickness T2 of the active material layer 22 and the functional layer 23, the second thickness measuring device 52 may be disposed at a rear of, i.e., behind or past, the gravure roll 33, which is an outflow side in the advancing direction M of the current collector 21.

It is preferable to uniformly maintain the sum thickness T2 of the active material layer 22 and the functional layer 23 in the electrode plate 2 regardless of a deviation of the thickness T1 of the active material layer 22. The first and second thickness measuring devices 51 and 52 may measure a thickness including a thickness of the current collector 21. Because the thickness of the current collector 21 is constant, the first and second thickness measuring devices 51 and 52 may equally disregard the thickness of the current collector 21 and, for convenience of explanation, in a description of the present embodiment, the thickness of the current collector 21 may be disregarded.

In order to uniformly maintain the sum thickness T2, even when the doctor blade 42 is abraded by the coating process, it may be desirable to scrape the functional layer material in a state that the pressure of the doctor blade 42 applied to the gravure roll 33 is uniformly maintained. That is, even when driving a coating apparatus for a long time, it may be desirable to uniformly perform scraping and to minimize abrasion of the doctor blade 42.

Figure 3:
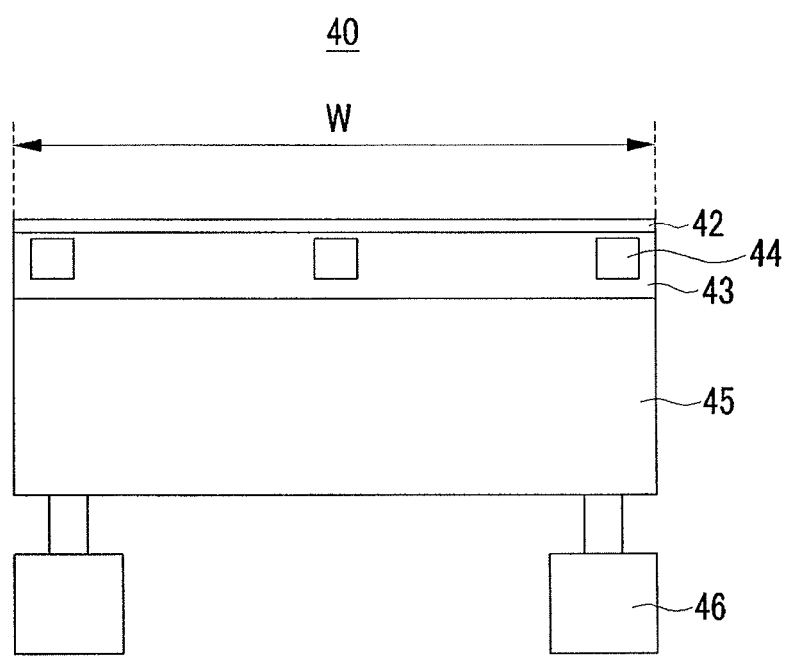
FIG. 3 illustrates a top plan view of a doctor blade unit of FIG. 1.

FIG. 3 illustrates a top plan view of a doctor blade unit. Referring to FIG. 3, the doctor blade unit 40 may uniformly maintain the pressure between the doctor blade 42 and the gravure roll 33. When the pressure is lowered due to, e.g., abrasion of the doctor blade 42, the pressure of the doctor blade unit 40 may be adjusted to a predetermined level by moving the doctor blade 42 toward the gravure roll 33. Therefore, as illustrated in FIG. 1, the doctor blade 42 may always maintain a constant pressure, i.e., pressing state, on the gravure roll 33. Thus, uniform scraping of the functional layer material from the gravure roll 33 may be facilitated.

In an implementation, the doctor blade unit 40 may include a support 43 attached to one side of the doctor blade 42, a strain gauge 44 attached to the support 43 to detect a strain of the doctor blade 42, a holder 45 that fixes the support 43 and the doctor blade 42, and a servo motor 46 that presses the doctor blade 42 to the gravure roll 33 by moving the holder 45.

The holder 45 may include an upper plate 451 and a lower plate 452 configured to open and close. The support 43 may be attached to the upper plate 451 of the holder 45. Because the strain gauge 44, the support 43, and the doctor blade 42 may be flexible, pressure between the gravure roll 33 and the doctor blade 42 may be reduced, due to abrasion of the doctor blade 42. In this case, the doctor blade 42 may be deformed in a spreading or bending direction from a bent state. When the doctor blade 42 is deformed in a spreading or bending direction due to a decrease or increase of pressure, the blading state, i.e., strain between the doctor blade 42 and the gravure roll 33, may be changed. The support 43 and the strain gauge 44 may be deformed along with the doctor blade 42. That is, a state change, i.e., strain, of the doctor blade 42 may be seen with a strain value change measured by the strain gauge 44.

By installing the strain gauge 44 on the support 43 and attaching the support 43 to one side of the doctor blade 42, when the doctor blade 42 is replaced due to abrasion, inconvenience of moving and installing the strain gauge 44 to a new doctor blade 42 may be eliminated. Further, the support 43 may have the strain gauge 44 installed with the new doctor blade 42 by a relatively simple operation of attaching the support 43 to the new doctor blade 42. In this case, a corresponding state of the strain gauge 44 to the new doctor blade 42 may be identical to a corresponding state of the strain gauge 44 to the old doctor blade 42. That is, the strain gauge 44 may detect strain of the doctor blade 42 in the same state.

The doctor blade 42 may have a sufficient width W in a direction intersecting the advancing direction M of the current collector 21 to facilitate scraping of the functional layer material to along an entire width of the gravure roll 33. The doctor blade 42 may have a width W that is relatively larger than a distance D (see FIG. 1) from the holder 45 to the gravure roll 33. Therefore, a plurality of strain gauges 44 may be provided on the support 43 with a predetermined gap therebetween. The plurality of strain gauges 44 may detect a strain of the doctor blade 42 over an entire width W of the doctor blade 42. Further, servo motors 46 may be provided at each side of the holder 45 to correspond to both sides of the width W of the doctor blade 42 to control a position of the doctor blade 42 through the holder 45.

Figure 4:
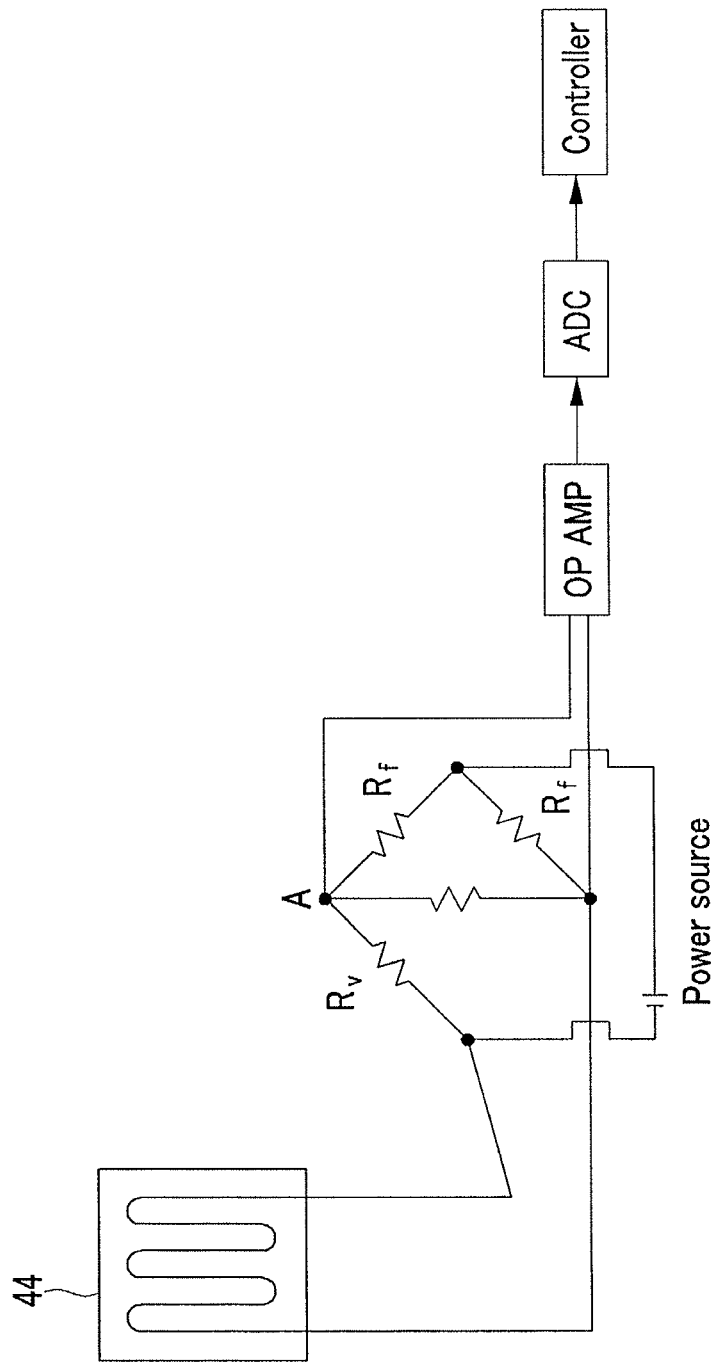
FIG. 4 illustrates a schematic diagram of an operation principle of a strain gauge.

FIG. 4 illustrates a schematic diagram of an operation principle of a strain gauge. Referring to FIG. 4, an operation principle of the strain gauge 44 is described using one strain gauge 44 and a Wheatstone bridge circuit that is formed with two fixed resistors Rf and one variable resistor Rv.

The strain gauge 44 is an element having a resistance value that changes according to bending or spreading deformation. That is, the strain gauge 44 may be bent or spread together with the doctor blade 42 using the support 43 as an intermediary, depending on a pressure change between the doctor blade 42 and the gravure roll 33. Therefore, a change of a resistance value (i.e., a strain of the strain gauge 44) that is measured in real time in the strain gauge 44 allows knowing a strain (i.e., a degree in which the doctor blade 42 is separated from an optimum blading state) of the doctor blade 42 in real time. An operational amplifier (OP AMP) and an analog to digital converter (ADC) may be connected between the strain gauge 44 and a controller 47.

That is, in an optimum blading state, the strain gauge 44 may be deformed and thus the resistance value of the strain gauge 44 may change. Accordingly, a voltage or a current that is distributed to the strain gauge 44 from the Wheatstone bridge circuit may change according to the resistance value of the strain gauge 44. In this way, after amplifying a minutely changing voltage or current in the OP AMP, the voltage or current may be converted to a digital value in the ADC and a measured strain value N2 of the doctor blade 42 that is checked in real time is stored in the controller 47. When the controller 47 is set, an initial strain value N1 of a state of the doctor blade 42 is stored. In order to sustain an optimum blading state of the doctor blade 42, the controller 47 may control the doctor blade 42 in order to make a measured strain value N2 of the doctor blade 42 that is checked in real time to be equal to the initial strain value N1.

Figure 5:
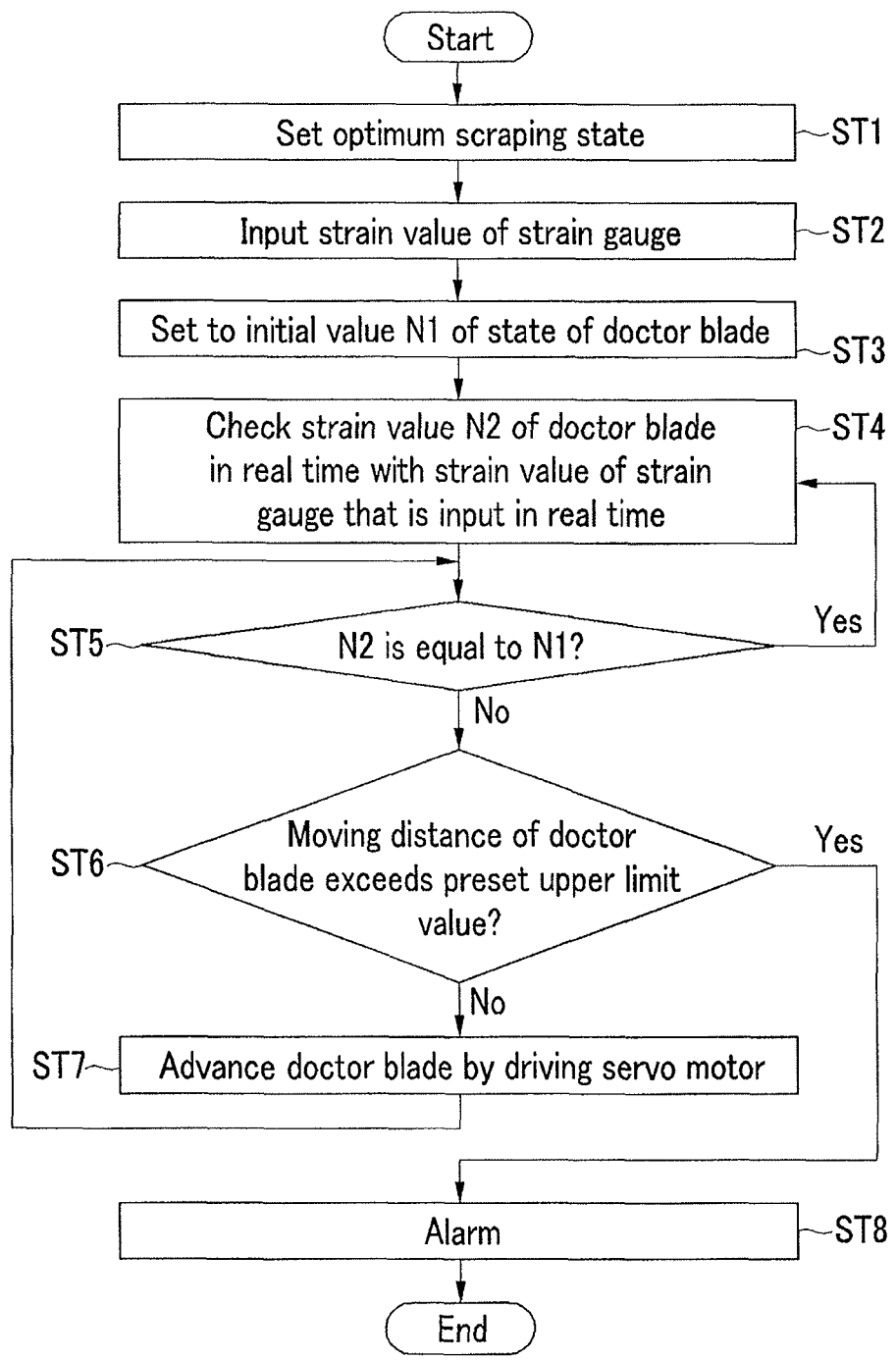
FIG. 5 illustrates a flowchart of a process of controlling a doctor blade.

FIG. 5 illustrates a flowchart of a process of controlling a doctor blade. Referring to FIG. 5, the process of controlling the doctor blade 42 according to a strain (i.e., blading state) of the doctor blade 42 will be described. The process of controlling the doctor blade 42 may include a first step ST1 that sets the doctor blade 42 to an optimum blading state, a second step ST2 that inputs a strain value of the strain gauge 44 in the optimum blading state, and a third step ST3 that sets an initial strain value N1 of the doctor blade 42 measured by the strain gauge 44.

The process of controlling the doctor blade 42 may further include a fourth step ST4 that checks a strain N2 of the doctor blade 42 in real time with the strain gauge 44 that is input in real time. The process may also include a fifth step ST5 that determines whether the strain N2 of the doctor blade 42 in real time is equal to the initial, i.e., optimal, strain N1 and then, if N2 is equal to N1, performs the fourth step ST4 again. If N2 is not equal to N1, a sixth step ST6 may determine whether a moving distance of the doctor blade 42 exceeds a preset upper limit value. If a moving distance of the doctor blade 42 exceeds a preset upper limit value, at an eighth step ST8, an alarm may sound to notify a user. If a moving distance of the doctor blade 42 does not exceed a preset upper limit value, the doctor blade 42 may be advanced by driving the servo motor 46 in a seventh step ST7.

At the first step ST1, upper limit values of an advancing speed and moving distance of the holder 45 and the doctor blade 42 may be directly set by a user.

At the first step ST1, the doctor blade 42 may be set to an optimum blading state. At the second step ST2, a strain measured by the strain gauge 44 may be input to the controller 47. At the third step ST3, an initial strain value N1 of the doctor blade 42 may be set. When the initial strain value N1 is set, the fixed resistor Rf may have a fixed resistance value and the variable resistor Rv may be set to have a separate resistance value. After the doctor blade 42 is installed in the holder 45, if the doctor blade 42 contacts the gravure roll 33, the strain gauge 44 may be deformed. In the deformed state, the doctor blade 42 may have a constant resistance value and the resistance value may be set to a resistance value of the variable resistor Rv. Accordingly, a voltage that is detected at a first point A and a second point B of the Wheatstone bridge circuit is 0, and this value may set to the initial value N1 of a strain of the doctor blade 42.

At the fourth step ST4, a strain value N2 of the doctor blade 42 may be measured in real time. At the fifth step ST5, the measured strain value N2 may be compared with the initial strain value N1. When the initial strain value N1 is set as a current, a first value of the current may be set as the initial strain value N1; and the initial strain value N1 may be compared with a strain value N2 of the doctor blade 42 that is checked in real time.

At the fifth step ST5, the controller 47 may compare the strain value N2 of the doctor blade 42 that is checked in real time while coating with the initial strain value N1. The controller 47 may determine a degree to which the doctor blade 42 deviates from an optimum blading state using a difference between the strain value N2 and the initial strain value N1. For example, if N2 is not equal to N1, the controller 47 may determine that the doctor blade 42 is abraded and may advance the holder 45 and the doctor blade 42 toward the gravure roll 33 by driving the servo motor 46 at the seventh step ST7. The controller 47 may reset the doctor blade 42 to an optimum blading state while coating by minutely advancing the doctor blade 42 until the strain value N2 of the doctor blade 42 that is checked in real time by a voltage or a current that is distributed to the strain gauge 44 reaches the initial strain value N1 while simultaneously performing the fifth to seventh steps ST5 to ST7.

At the sixth step ST6, if a moving distance of the doctor blade 42 exceeds the predetermined upper limit value (i.e., a state where the doctor blade 42 excessively approaches the current collector 21), the controller 47 may generate an alarm before terminating the control (ST8). At the sixth step ST6, the controller 47 may determine whether the doctor blade 42 has reached an upper limit value of a moving distance through a detection signal from a limit switch 48. The limit switch 48 may be installed in a moving route of the holder 45 or the doctor blade 42 at a position corresponding to the predetermined upper limit of movement. Thus, when the holder 45 or the doctor blade 42 contacts the limit switch 48, the limit switch 48 may send a signal to the controller indicating that the predetermined upper limit value has been reached. In an alternative implementation, the upper limit value of the moving distance of the doctor blade 42 may be determined with an encoder value of a rotation number.

Referring again to FIG. 3, at the sixth step ST6, when the holder 45 advances by way of the servo motor 46, if a right side of the doctor blade 42 is abraded to a greater degree than a left side thereof, or vice versa, resistance values (i.e., strain values of the doctor blade 42) that are measured from each of, e.g., three, strain gauges 44 may be different. Accordingly, the controller 47 may selectively control the servo motors 46 in real time at each of the right side and the left side of the holder 45 to uniformly apply a pressing force of the doctor blade 42 on the gravure roll 33 along the entire width W of the doctor blade 42. That is, when the right side of the doctor blade 42 is abraded to a greater degree than the left side thereof, the controller 47 may further advance the servo motor 46 that is positioned at the right side that of than the left side. Thus, uniform scraping may be performed along the entire width W of the doctor blade 42.

Figure 6:
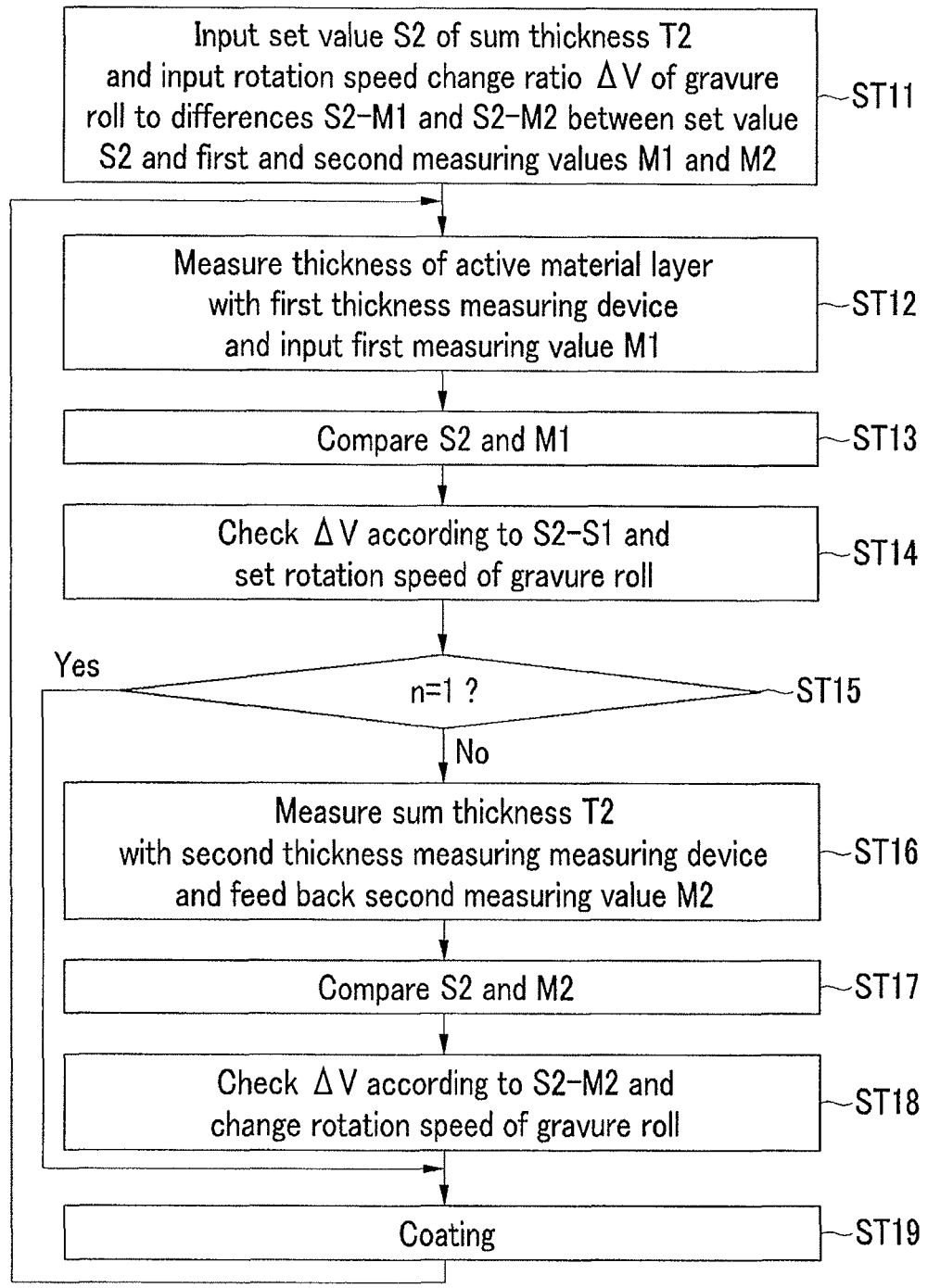
FIG. 6 illustrates a flowchart of a method of coating a functional layer according to an embodiment.

FIG. 6 illustrates a flowchart of a method of coating a functional layer according to an embodiment. Referring to FIG. 6, the method of coating a functional layer (hereinafter referred to as a "coating method") according to the present embodiment may include the coating apparatus of FIG. 1 and the process of controlling a doctor blade of FIG. 5. That is, the coating method according to the present embodiment may include maintaining the doctor blade 42 in an optimum blading state (see FIG. 3) by detecting in real time a strain of the doctor blade 42 for blading a functional material on the gravure roll 33 and comparing the measured strain of the doctor blade 42 that is detected in real time with an optimum blading state. Also, the coating method may include a step of controlling a rotation speed of the gravure roll 33 in order to correspond the measured value to the set value (see FIG. 6) by measuring a thickness T1 of the active material layer 22 that is formed on the current collector 21 that is advanced in one direction and comparing the measured value with the set value.

Here, the first and second thickness measuring devices 51 and 52 and the gravure roll 33 will be described. The control of the doctor blade of FIG. 5 may be performed together with the coating method of FIG. 6.

Figure 7:
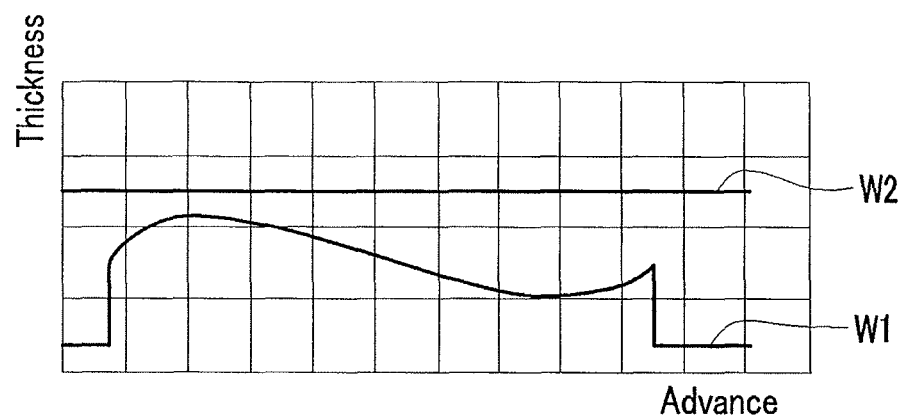
FIG. 7 illustrates a waveform diagram of a first thickness measuring device and a second thickness measuring device that measure a thickness before and after coating a functional layer.
Figure 8:
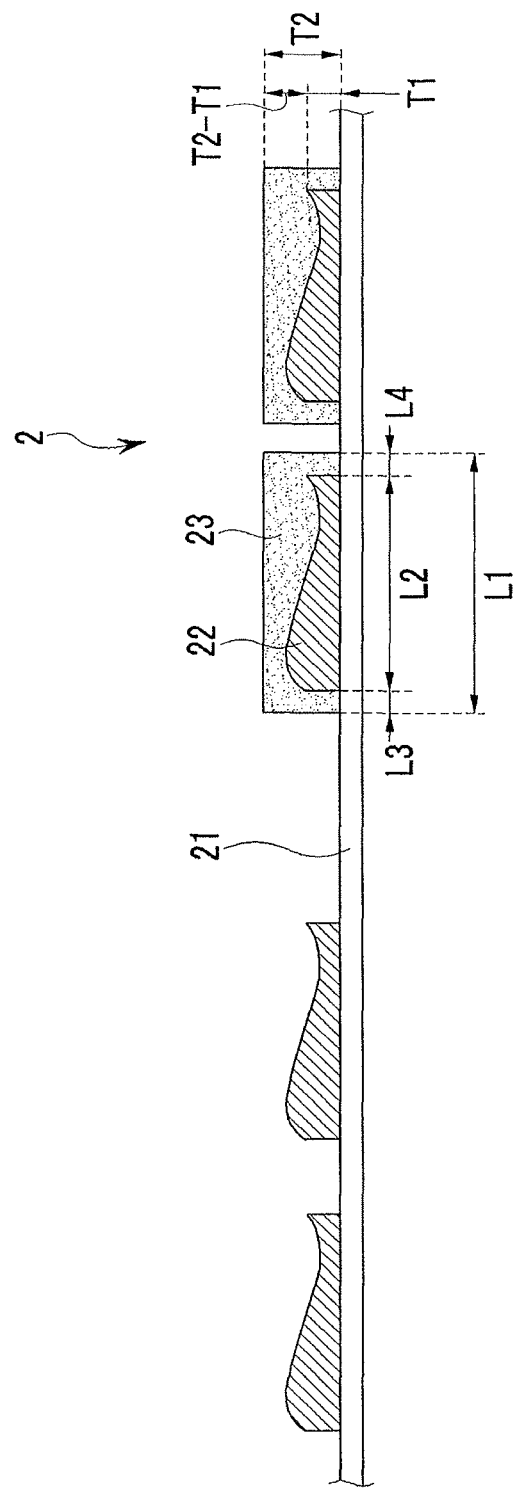
FIG. 8 illustrates a cross-sectional view of an electrode plate before and after coating a functional layer.

FIG. 7 illustrates a waveform diagram of a first thickness measuring device and a second thickness measuring device that measure a thickness before and after coating a functional layer. FIG. 8 illustrates a cross-sectional view of an electrode plate before and after coating a functional layer. Referring to FIGS. 7 and 8, the first thickness measuring device 51 may measure a thickness T1 of the active material layer 22 before coating the functional layer 23 thereon. The first thickness measuring device 51 may form a first waveform W1 corresponding to a surface shape of the active material layer 22. The second thickness measuring device 52 may measure a sum thickness T2 of the active material layer 22 and the functional layer 23 after coating the functional layer 23. The second thickness measuring device 52 may form a uniform second waveform W2 regardless of a surface shape of the active material layer 22, as illustrated in FIG. 7.

Referring again to FIG. 6, a coating method according to an embodiment may form the functional layer 23 on the active material layer 22, as illustrated in FIG. 8. Then, the second thickness measuring device 52 may output the second waveform W2, as illustrated in FIG. 7. For example, the coating method may control a capacity of the fine groove of the gravure roll 33 receiving the functional layer material and may control the rotation speed of the gravure roll 33 and the advancing speed of the current collector 21. For convenience of explanation, in the present embodiment, the advancing speed of the current collector 21 may be uniformly maintained and the rotation speed of the gravure roll 33 may be controlled. When the advancing speed of the current collector 21 is constant, if the rotation speed of the gravure roll 33 increases, the coating thickness T2−T1 of the functional layer 23 may become thin. If the rotation speed of the gravure roll 33 decreases, the coating thickness T2−T1 of the functional layer 23 may become thick.

The coating method of the present embodiment may include an eleventh step ST11 that inputs a set value, i.e., predetermined desired value, S2 of a sum thickness T2 of the active material layer 22 and the functional layer 23 after coating and that inputs a rotation speed change ratio ΔV of the gravure roll 33 based on a difference S2−M1 between the set value S2 and a first measured value M1 of a thickness T1 of the active material layer 22. The coating method may also include determining a difference S2−M2 between the set value S2 and a second measured value M2 of a sum thickness T2 of the active material layer 22 and the functional layer 23. The coating method may also include a twelfth step ST12 that measures the thickness T1 of the active material layer 22 with the first thickness measuring device 51 and that inputs the first measured value M1. The coating method may also include a thirteenth step ST13 that compares the set value S2 and the inputted first measured value M1. The coating method may also include a fourteenth step ST14 that adjusts the rotation speed change ratio ΔV according to a difference between the thicknesses, i.e., a difference S2−M1 between the set value S2 and the first measured value M1 and that primarily sets the rotation speed of the gravure roll 33. The coating method may also include a fifteenth step ST15 that determines whether an order (n) of the active material layer 22 is 1. When the order of the coating process (n) is 1 (that is, when the coating process is performed on the active material layer 22 coated first among a plurality of active material layers 22 on one current collector 21), the functional layer 23 may be coated with the set rotation speed in a nineteenth step ST19.

In the nineteenth step ST19, the functional layer 23 may be formed on the active material layer such that side end portions L3 and L4 of the functional layer 23 by are formed by the functional layer material at both ends of the active material layer 22. The side end portions L3 and L4 may eliminate a deviation of the sum thickness T2 at a boundary of the active material layer 22 and the uncoated portion.

At the thirteenth step ST13, the first measured value M1 may be continuously measured when an active material layer is continuously provided (not illustrated). The first measured value M1 may be measured in a cut state for a predetermined time period when the active material layer 22 is formed in a pattern (see FIG. 8).

In the coating method of the present embodiment, the sum thickness T2 of the active material layer 22 and the functional layer 23 may be uniformly formed based on the first waveform W1 of the first thickness measuring device 51. However, the sum thickness T2 may be more uniformly formed based on the second waveform W2 of the second thickness measuring device 52. In this case, at the eleventh step ST11, a rotation speed change ratio ΔV of the gravure roll 33 based on a difference S2−M2 between the set value S2 and the second measured value M2 of the sum thickness T2 may be further input.

Figure 9:
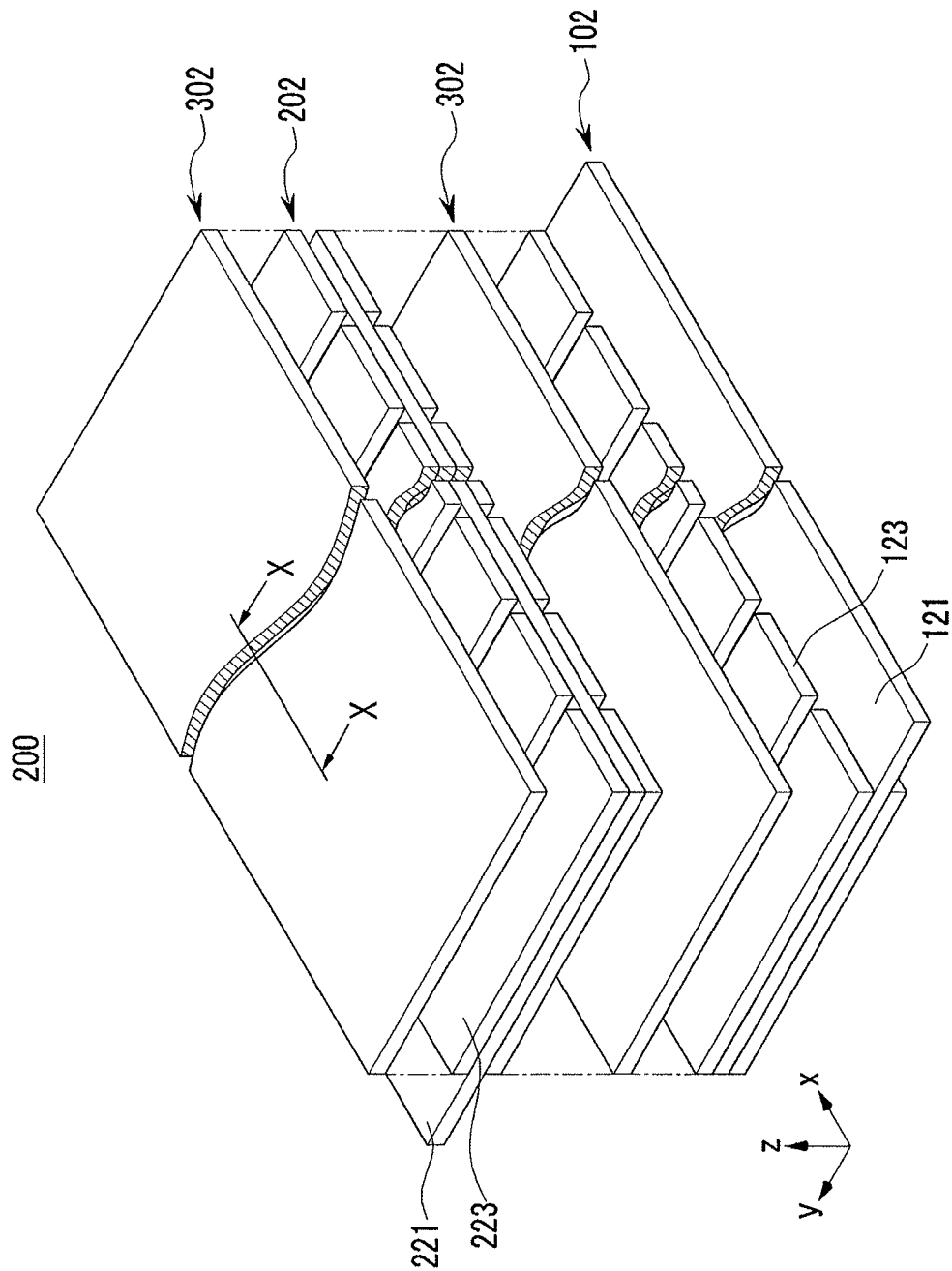
FIG. 9 illustrates an exploded perspective view of an electrode assembly in a rechargeable battery formed by an apparatus according to an embodiment.
Figure 10:
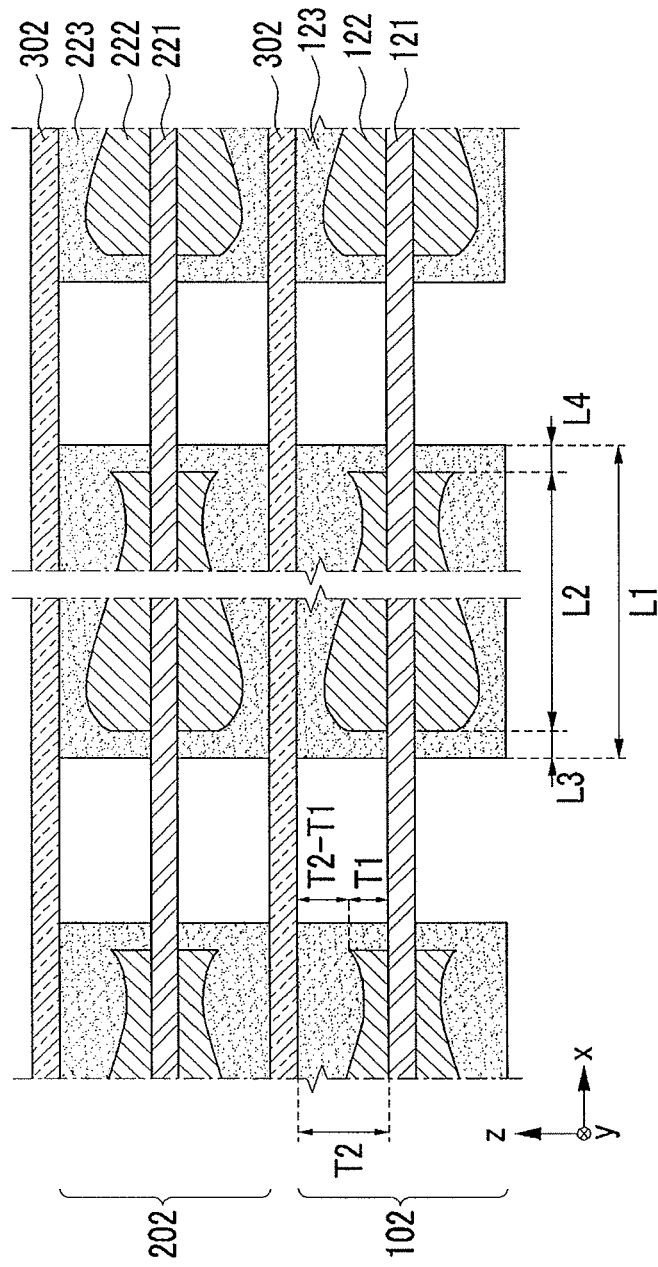
FIG. 10 illustrates a cross-sectional view of the electrode assembly taken along line X-X of FIG. 9.

In particular, the coating method may include a sixteenth step ST16 that measures the sum thickness T2 with the second thickness measuring device 52 downstream of the gravure roll 33 and that feeds back the second measured value M2 after first coating at the nineteenth step ST19 (i.e., the order (n) is not 1, e.g., at least 2). The coating method may also include a seventeenth step ST17 that then compares the set value S2 and the feedback second measured value M2. The coating method may also include an eighteenth step ST18 that adjusts a rotation speed change ratio ΔV upstream of the measurer according to a thickness difference, i.e., a difference S2−M2 between the set value S2 and the second measured value M2 and that controls a rotation speed by, e.g., increasing or decreasing, the rotation speed of the gravure roll 33 to achieve the rotation speed set at the fourteenth step ST14. Finally, the coating method may include a nineteenth step ST19 that coats in this state. At the sixteenth step ST16 to the eighteenth step ST18, the sum thickness T2 of the active material layer 23 and the functional layer 23, which is coated at the previous coating process, may be measured by the second thickness measuring device 52. In other words, the second thickness measuring device 52 may measure the sum thickness T2 of one of the functional layer 23/active material layer 22 structures and determine if the overall sum thickness T2 deviates from the predetermined desired sum thickness S2. If the overall sum thickness T2 of the already formed functional layer 23/active material layer 22 structure deviates from the desired sum thickness S2, the rotational speed of the gravure roll 33 may be adjusted such that the overall sum thickness T2 of later formed functional layer 23/active material layer 22 structures may be equal to the predetermined desired sum thickness S2. Thus, the sum thickness T2 may be more uniform at the subsequent nineteenth step ST19, FIG. 9 illustrates an exploded perspective view of an electrode assembly in a rechargeable battery prepared according to an embodiment. FIG. 10 illustrates a cross-sectional view of the electrode assembly taken along line X-X of FIG. 9. Referring to FIGS. 9 and 10, the rechargeable battery prepared according to the embodiment will be described based on an electrode assembly 200. A case accommodating the electrode assembly 200 therein and a cap assembly that is electrically connected to the electrode assembly 200 may use well-known technologies, and therefore a detailed description thereof will be omitted.

The electrode assembly 200 may include a first electrode plate 102 and a second electrode plate 202 that respectively form a positive electrode and a negative electrode. The electrode assembly 200 may also include a separation film 302 disposed between the first electrode plate 102 and the second electrode plate 202. The electrode assembly 200 may be formed by disposing and winding the separation film 302 between the first electrode plate 102 and the second electrode plate 202. The first electrode plate 102 may have a first active material layer 122 and a first functional layer 123 on a first current collector 121. The second electrode plate 202 may have a second active material layer 222 and a second functional layer 223 on a second current collector 221. In a winding state, a stacked structure of the second active material layer 222 and the second functional layer 223 may be opposite to a stacked structure of the first active material layer 122 and the first functional layer 123 with the separation film 302 interposed therebetween.

The first and second electrode plates 102 and 202 may have the same structure and thus only the first electrode plate 102 will be described. In the first electrode plate 102, the first active material layer 122 may have an irregular thickness T1 in a length direction (x-axis direction) of the first current collector 121; and the first functional layer 123 together with the first active material layer 122 may have a uniform sum thickness T2 in spite of a deviation of the thickness T1. That is, the sum thickness T2 may correspond to the set value S2.

Further, the first functional layer 123 may have a length L1 that is longer than a length L2 of the first active material layer 122 to further form side end portions L3 and L4 of the first functional layer 123 that is made of a functional layer material at both ends of the first active material layer 122. Because the side end portions L3 and L4 may eliminate a deviation of the sum thickness T2 at the boundary of the first active material layer 122 and the uncoated portion, the side end portions L3 and L4 may prevent a cell shape from being formed in a non-uniform shape. In particular, the side end portions L3 and L4 may prevent uneven pressure from being applied to the electrode assembly 200 during winding. Accordingly, an electrolyte solution may not be prevented from being impregnated due to the non-uniform shape and uneven pressure.

By way of review, the active material layer supplied to the current collector by the coating apparatus may have a thickness protruding from the current collector. According to an embodiment, the thickness of the active material layer may be uniform in a traveling direction of the current collector, i.e., it may not have a thickness deviation along its length. Therefore, when coating a functional layer in a uniform thickness on an active material layer having a thickness deviation, a sum thickness of the active material layer and the functional layer may not propagate the thickness deviation of the active material layer. At a boundary of an uncoated portion in which no active material layer exist and the active material layer, a step difference may be formed. However, according to the apparatus and method of an embodiment, the thickness of a functional coating layer on the uncoated portion may not be formed as thinly as a thickness of the active material layer.

After a functional layer is coated on the active layer according to an embodiment, an electrode plate having the layers with a thickness deviation may not receive an uneven pressure upon performing a winding process. After winding, the electrode plate uniformity may result in a inform cell shape. Thus, an electrolyte solution may be uniformly impregnated and thus ions may smoothly move between a positive electrode plate and a negative electrode plate.

According to a functional layer coating apparatus of an embodiment, by measuring in real time a strain of a doctor blade (i.e., a pressure between the doctor blade and a gravure roll) using a strain gauge while coating a functional layer material, scraping of a functional layer material of the gravure roll may be uniformly performed and abrasion of the doctor blade may be advantageously minimized.

According to a method of coating a functional layer of an embodiment, by comparing a set value to a sum thickness of an active material layer and a functional layer and a first measuring value, which is a thickness of the active material layer that is measured at an inflow side at which a current collector advances to a coating apparatus and changing a rotation speed of a gravure roll according to a difference between the set value and the first measuring value and coating the functional layer, the functional layer may be coated such that a sum thickness of the active material layer and the functional layer may correspond to the set value. That is, a sum thickness of the active material layer and the functional layer may be uniformly formed regardless of a thickness deviation of the active material layer.

According to a method of coating a functional layer of an embodiment, by changing a rotation speed of a gravure roll with a first measuring value, a sum thickness of an active material layer and a functional layer may be uniformly formed. However, by additionally comparing a second measuring value, which is a sum thickness that is measured at an outflow side of a coating apparatus with a set value and further changing a rotation speed of the gravure roll according to a difference between the set value and the second measuring value and coating the functional layer, the functional layer may be coated so that a sum thickness of the active material layer and the functional layer of later coated layers may further corresponds to the set value.

According to a rechargeable battery formed according to an embodiment, by providing a thickness of a functional layer to be inversely proportional to a thickness of an active material layer in an electrode plate, a sum thickness of the active material layer and the functional layer may be uniformly formed. Thus, upon winding the electrode plate, a cell form may be uniformly formed by a uniform pressure; and a failure of impregnation of an electrolyte solution may be prevented.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An apparatus for coating a functional layer on a current collector with an active material layer thereon, the apparatus comprising:
    a gravure roll configured to coat the functional layer on the active material layer;
    a doctor blade unit including:
        a doctor blade, the doctor blade unit being configured to scrape excess functional layer material off the gravure roll with the doctor blade,
        at least one strain gauge configured to measure a strain of the doctor blade,
        a support between the doctor blade and the at least one strain gauge,
        a holder holding the support and the doctor blade, and
        at least one servo motor configured to move the holder relative to the gravure roll and change a pressure between the doctor blade and the gravure roll;
    a first thickness measuring device configured to measure a thickness of the active material layer without the functional layer;
    a second thickness measuring device configured to measure a sum thickness of the active material layer and the functional layer; and
    a controller in communication with the at least one strain gauge, the first thickness measuring device, the second thickness measuring device, at least one servo motor, and the gravure roll,
    wherein:
    the holder includes an upper plate holding the support and a lower plate holding the doctor blade,
    the controller is configured to control a position of the doctor blade unit based on the strain of the doctor blade by controlling the at least one servo motor, and
    the controller is further configured to control a rotational speed of the gravure roll based on the thickness measured by the first thickness measuring device and the sum thickness measured by the second thickness measuring device.

2. A method of coating a functional layer on a current collector with an active material layer thereon, the method comprising:
    detecting a measured strain on a doctor blade;
    comparing the measured strain with an optimum value for strain on the doctor blade;
    maintaining the doctor blade in an optimum blading state based on detecting the measured strain and comparing the measured strain with the optimum value for stain, thereby removing excess functional layer material from a gravure roll;
    advancing the current collector having the active material layer thereon; and
    coating the functional layer on the active material layer with the gravure roll such that a sum thickness of the functional layer and the active material layer is uniform across a length of the functional layer,
    wherein:
    maintaining the doctor blade in the optimum blading state includes detecting the measured strain with at least one strain gauge, the at least one stain gauge being disposed on a support, the support being between the strain gauge and the doctor blade, and
    the support and the doctor blade are held by a holder, the holder including an upper plate holding the support and a lower plate holding the doctor blade,
    the method further including moving the holder relative to the gravure roll in order to change a pressure between the doctor blade and the gravure roll using a controller in communication with the at least one strain gauge and the gravure roll.

3. The method as claimed in claim 2, wherein maintaining the doctor blade in the optimum blading state includes changing a pressure between the doctor blade and the gravure roll by moving the doctor blade relative to the gravure roll using at least one servo motor based on a difference between the measured strain and the optimum value for the strain.

4. The method as claimed in claim 2, wherein maintaining the doctor blade in the optimum blading state includes:
    setting the doctor blade in the optimum blading state against the gravure roll;
    measuring the optimum value for stain with the at least one strain gauge while the doctor blade is in the optimum blading state;
    inputting the optimum value for strain to the controller;
    continuously measuring a measured stain on the doctor blade with the at least one stain gauge,
    comparing the measured strain to the optimum value for stain, and
    optimizing the pressure between the doctor blade and the gravure roll by moving the doctor blade relative to the gravure roll when the measured stain does not equal the optimum value for strain.

5. The method as claimed in claim 4, wherein maintaining the doctor blade in the optimum blading state further includes sounding an alarm when a distance that the doctor blade has moved relative to the gravure roll is greater than a predetermined upper limit distance.

6. The apparatus as claimed in claim 1, wherein the controller controls the rotational speed of the gravure roll such that reducing the rotation speed of the gravure roll increases an amount of the functional layer coated on the active material layer.

* * * * *